United States Patent
Lu et al.

(10) Patent No.: US 11,204,642 B2
(45) Date of Patent: Dec. 21, 2021

(54) TEST METHOD FOR EYE TRACKING ALGORITHM

(71) Applicant: Qingdao Research Institute of Beihang University, Shandong (CN)

(72) Inventors: Feng Lu, Shandong (CN); Yang Yu, Shandong (CN); Kai Li, Shandong (CN)

(73) Assignee: Qingdao Research Institute of Beihang University, Shandong (CN)

(*) Notice: Subject to any disclaimer, the term of this patent is extended or adjusted under 35 U.S.C. 154(b) by 0 days.

(21) Appl. No.: 17/082,588

(22) Filed: Oct. 28, 2020

(65) Prior Publication Data

US 2021/0132692 A1 May 6, 2021

(30) Foreign Application Priority Data

Oct. 31, 2019 (CN) .......................... 201911051680.9

(51) Int. Cl.
*G06F 3/01* (2006.01)

(52) U.S. Cl.
CPC .................................... *G06F 3/013* (2013.01)

(58) Field of Classification Search
CPC ....................................................... G06F 3/013
See application file for complete search history.

(56) References Cited

U.S. PATENT DOCUMENTS 10,326,977 B1* 6/2019 Mercier .................... G01S 3/00
2017/0188823 A1* 7/2017 Ganesan ............ G02B 27/0093

OTHER PUBLICATIONS

Nagel JA, Kutschker C, Beck C, Gengenbach U, Guth H, Bretthauer G. Comparison of Different Algorithms for Robust Detection of Pupils in Real-Time Eye-Tracking Experiments. Biomed Tech (Berl). Aug. 2013 (Year: 2013).*
Stein, N., Niehorster, D. C., Watson, T., Steinicke, F., Rifai, K., Wahl, S., & Lappe, M. (2021). A Comparison of Eye Tracking Latencies Among Several Commercial Head-Mounted Displays. I-Perception. (Year: 2021).*

* cited by examiner

*Primary Examiner* — Shivang I Patel
(74) *Attorney, Agent, or Firm* — Cooper Legal Group, LLC

(57) ABSTRACT

A test method for an eye tracking algorithm creatively defines indicators for eye tracking algorithm performance test, and proposes a general environment and an overall process for the eye tracking algorithm performance test to realize the versatility of the eye tracking algorithm test, improve the algorithm development efficiency, shorten the development cycle, and provide a direction and reference for the algorithm development and iteration. The test method decouples the performance test of an eye tracking algorithm from development of the eye tracking algorithm itself, so that a test environment is not limited to a specific eye tracking algorithm and a general performance test environment for the eye tracking algorithm is established. The test method includes: defining indicators for the eye tracking algorithm performance test, defining an overall architecture of a performance test environment of the eye tracking algorithm, and proposing steps for performing the eye tracking algorithm performance test.

7 Claims, 5 Drawing Sheets

TEST METHOD FOR EYE TRACKING ALGORITHM

RELATED APPLICATION

This application claims the benefit of priority from Chinese Patent Application No. 201911051680.9, filed on Oct. 31, 2020. The content of the aforementioned application, including any intervening amendments thereto, is incorporated herein by reference in its entirety.

TECHNICAL FIELD

The disclosure relates to a method for comprehensive testing and evaluation of performance indicators of an eye tracking algorithm. Specifically, the disclosure relates to a method for measuring the pros and cons of the performance indicators of an eye tracking algorithm from multiple dimensions and verifying correctness of an eye tracking algorithm that satisfies an input format. The disclosure belongs to the fields of computer vision and graphics.

BACKGROUND

With the rapid development of eye tracking technology, the improvement of eye tracking algorithms has received increasing attention in the field of computer vision, and has become one of the hot issues in the existing vision and graphics processing technologies. In virtual reality, artificial intelligence and human-computer interaction have quite bright research prospects and business application background.

Eye tracking refers to tracking the eyeball by measuring a position of a gaze point of the eye or the movement of the eyeball relative to the head. More generally, eye tracking is to determine a position of a gaze point of the eye or a precise direction of the gaze.

Currently, there are two main methods of eye tracking: model-based eye tracking and appearance-based eye tracking. The model-based eye tracking technology is currently the most accurate but also the most expensive. A device generally estimates a gaze vector by establishing an eyeball model, using additional infrared light sources and cameras as auxiliary devices, and solving equations. In addition, thanks to the development of deep learning, the appearance-based eye tracking technology has developed rapidly in recent years. The advantage of this technology is that no additional infrared light source is needed, the device is simple, and generally only one camera is needed. The appearance-based eye tracking technology only needs eye images as input to predict a gaze vector, and is robust to factors such as illumination, skin colors, and head positions.

Any type of eye tracking algorithm requires corresponding indicator parameters to measure final eye tracking performance Therefore, the development of eye tracking algorithms has the following design and test requirements: First, it is necessary to measure the quality of the eye tracking algorithm itself, including but not limited to the algorithm precision, accuracy, and robustness to external environments such as illumination. Second, for two algorithms A and B of the same type, if the algorithm B has made modifications on the basis of the algorithm A (such as modification of the algorithm itself and modification of algorithm input), a capability of measuring a degree of difference between the two algorithms is required to analyze impact of such modifications on the performance of eye tracking. Third, for different types of eye tracking algorithms, it is necessary to compare their pros and cons.

At present, there is no general performance test solution for eye tracking algorithms. In view of this, this patent application is hereby filed.

SUMMARY

To solve the actual needs and technical difficulties existing in the prior art, a test method for an eye tracking algorithm according to the disclosure creatively defines indicators for eye tracking algorithm performance test, and proposes a general environment and an overall process for the eye tracking algorithm performance test around the relevant test indicators to realize the versatility of the eye tracking algorithm test, improve the algorithm development efficiency, shorten the development cycle, and provide a direction and reference for the algorithm development and iteration.

To achieve the foregoing purposes, the test method for an eye tracking algorithm in this application decouples performance test of an eye tracking algorithm from development of the eye tracking algorithm itself, so that a test environment is not limited to a specific eye tracking algorithm and a general performance test environment for the eye tracking algorithm is established.

Based on the above solution concept, the test method of this application proposes the following three designs: defining indicators for the eye tracking algorithm performance test, defining an overall architecture of a performance test environment for the eye tracking algorithm, and proposing steps for performing the eye tracking algorithm performance test.

1. Definition of Performance Test Indicators for the Eye Tracking Algorithm

The defined test indicators include a single-instance performance indicator, an intra-group performance indicator, and an inter-group performance indicator.

The single-instance indicator includes but is not limited to stability, precision, and a running speed.

The intra-group performance indicator is a result of an intra-group indicator calculation module, for example, $S(i,j)$, which is a collection of all performance indicators of an algorithm i on test data with a group index j. The intra-group performance indicator $S(i,j)$ includes but is not limited to accuracy, variance, a maximum difference, and precision.

The inter-group performance indicator includes but is not limited to robustness.

An indicator for measuring overall performance is defined in the following formula:

$$V(m) = \frac{1}{t} * \left( a * acc * e^{-dist} + \beta * \left( \bar{e} + \frac{1}{e_{max}} \right) - \gamma * \sum_{tag} T(m, tag) \right)$$

where, m represents an algorithm number. A larger value of $V(m)$ indicates a better eye tracking algorithm.

$\alpha$, $\beta$, and $\gamma$ are constants greater than 0, and $\gamma$ is generally set to a small value. A good eye tracking algorithm should be stable, accurate, and fast. Even if the algorithm is poor, it should have a certain accuracy and be robust to most external environmental conditions.

2. Definition of an Overall Architecture of a Performance Test Environment for an Eye Tracking Algorithm The overall test architecture includes an input module and an internal structure of the input module, an indicator calculation module and an internal structure of the calculation module, and an overall format of each test data provided by a test environment.

The overall architecture includes:

an input module, configured to generate and manage test data required by the algorithm, which is grouped by tags;

an eye tracking calculation module, configured to obtain an eye tracking prediction result based on input test data and a used eye tracking algorithm; and an indicator calculation module, configured to calculate various types of indicators based on a predicted result and a real result, save and output results.

In order to ensure the versatility of the test environment, it is stipulated that an output of the input module be aligned with an interface of the eye tracking calculation module, that is, the eye tracking algorithm is required to have an input and output format that meets requirements.

The unification of test data formats is the key to decoupling the overall test environment from the algorithm. The test data format is mainly divided into the following three parts:

1) Input Feature

A set of input data that an algorithm needs to use is denoted as input. The input includes but is not limited to camera-related information, infrared light-related information, and eye image-related information, and can be extended by increasing an amount of data in the Input field.

The input data is divided into blocks according to correlation of the data. Each slot in the Input field is abstracted as a part of the input data. The camera-related information in the input data is abstracted into a specific field, which includes information such as a quantity of cameras and internal and external parameters of a camera.

Different eye tracking algorithms can obtain results of eye tracking (that is, a gaze vector or a gaze point position) by finding a solution based on the data in the Input field by using a convolutional neural network or a traditional pupil center corneal reflection (PCCR) method.

2) Predicted Value

An output of the eye tracking algorithm is denoted as output. The Prediction information field is recorded. Types of the Label information fields of the test data are the same. These two fields must exist, and internal data of the fields can be extended.

3) Environmental Condition

Environmental conditions during input data collection are denoted as tags. Typical tags can be divided into environmental information, individual information, and applicable algorithm type. An illumination condition, and indoor or outdoor may be classified as external environment information. Bright or dark pupil, and race may be classified as individual information.

3. Process of the Performance Test Method for the Eye Tracking Algorithm

Based on the above-mentioned performance test indicators and test environment for the eye tracking algorithm, the method includes the following steps:

1) Test of Performances of the Algorithm Itself

For a to-be-tested eye tracking algorithm, determine whether there is a test data group suitable for the algorithm in a current test module data list; if yes, take out the corresponding test data group, run the algorithm, calculate corresponding indicators, and store them to complete a single-step test process of the entire algorithm.

If there is no test data group that satisfies the algorithm, check whether there is a test data instance meeting a corresponding tag in a data pool. If yes, take out the test data instance to form a data group, and then perform test; if no, generate virtual data or collect actual data that meets requirements of the algorithm, put the data into the data pool, and repeat the preceding steps to complete the calculation of performance indicators of a single algorithm.

2) Comparison for Algorithms Under a Same Test Data Group

To compare performance indicators of multiple algorithms on the same test data group, run each algorithm on the test data group to obtain S(m,i), an indicator set of an algorithm m on the $i^{th}$ group of test data; obtain S(m,j) in the same way, and further obtain T(m,tag).

3) Performance Test Comparison of a Same Algorithm Under Different Test Data Groups Run the algorithm on different test data groups to obtain the indicator set S(m,i) of the algorithm m on the $i^{th}$ group of test data, and obtain S(m,j) in the same way. If the $i^{th}$ group of test data and the $j^{th}$ group of test data only differ in data x in a specific group, such performance comparison aims to compare the robustness of the algorithm to the specific group, that is, whether the algorithm performs better with the data x.

In summary, the test method based on an eye tracking algorithm of this application has the following advantages and beneficial effects:

1. This application decouples the performance test of an eye tracking algorithm from development of the eye tracking algorithm itself, so that a test environment is not limited to a specific eye tracking algorithm and a general performance test environment for the eye tracking algorithm is established.

2. Designing a performance indicator test environment based on the eye tracking algorithm can measure performance indicators of an eye tracking algorithm meeting an input format from multiple dimensions, compare pros and cons of the algorithm, and verify correctness of its technical solution. This method is a truly universal testing and evaluation method.

3. On the basis of realizing the versatility of the eye tracking algorithm test, this method can also improve the algorithm development efficiency, shorten the development cycle, and provide a direction and reference for the algorithm development and iteration.

DETAILED DESCRIPTION

Figure 1:
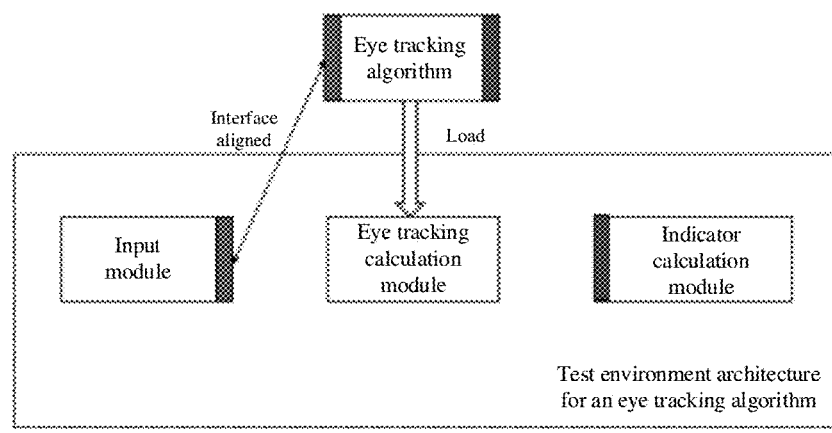
FIG. 1 is a schematic diagram of an overall architecture of a test environment for an eye tracking algorithm according to this application.

The following further describes the disclosure in detail with reference to the accompanying drawings and examples.

As shown in FIG. 1 to FIG. 5, this application proposes a general performance test method for an eye tracking algorithm, including: defining performance test indicators for the eye tracking algorithm, defining an overall architecture of a performance test environment for the eye tracking algorithm, and proposing steps for performing performance test for the eye tracking algorithm.

Specifically, the test method for an eye tracking algorithm proposes solutions for the following three parts.

Part 1. Definition of Performance Test Indicators for the Eye Tracking Algorithm The defined test indicators include a single-instance performance indicator, an intra-group performance indicator, and an inter-group performance indicator.

1. Single-Instance Indicator

Single-instance indicators include but are not limited to the following:

1) Stability

An algorithm is determined as stable when and only when the algorithm is injective, that is, for any data, results obtained by running the eye tracking algorithm multiple times are the same.

Assume that a number of algorithm running times is N (N>1), each predicted result is p, and a mean value is u.

When s is 0, the algorithm is stable; otherwise, the algorithm is unstable.

That is, $$s = \frac{1}{N}\sum_{i=1}^{N} \|p_i - u\|_2^2.$$

2) Precision

Use a single test instance as the mean, specify a variance to generate a high-dimensional Gaussian mixture model of test data, perform sampling to obtain a group of test data related to the test instance, and run the algorithm multiple times to measure a degree of dispersion of output results.

A purpose of this indicator is to test whether output data of the eye tracking algorithm is highly aggregated for highly aggregated input data. Assuming that $\bar{u}$ is the mean and $\Sigma$ is a covariance, multidimensional Gaussian distribution is as follows:

$$N(\bar{x} \mid \bar{u}, \Sigma) = \frac{1}{(2\pi)^{D/2}} \frac{1}{|\Sigma|^{1/2}} \exp\left[-\frac{1}{2}(\bar{x} - \bar{u})^T \Sigma^{-1}(\bar{x} - \bar{u})\right]$$

A test data set obtained by sampling the high-dimensional Gaussian distribution generated by test data $\bar{x}$ is denoted as G, and a result set predicted on the test data set G is denoted as G'. Then a radius of the predicted value set is defined as follows:

$$dist = \max_{1 \le i < j \le n} \{\|g_i - g_j\| \mid g_j \in G\}$$

As shown in the preceding formula, a smaller radius value means that the eye tracking algorithm has an anti-interference ability for the input.

3) Running Speed

Eye tracking requires high real-time performance Although some algorithms have high precision, they run slowly. A good eye tracking algorithm usually requires a compromise between speed and accuracy.

For example, t represents the time required for an algorithm to run once. In principle, the smaller the value of t, the better.

2. Intra-Group Performance Indicator

A result of an intra-group indicator calculation module is defined as S(i,j), which is a collection of all performance indicators of an algorithm i on test data with a group index j. The intra-group performance indicator S(i,j) includes but is not limited to the following:

1) Accuracy

Accuracy reflects a degree of difference between a predicted value and a true value, and is mainly represented by a mean error.

A formula is as follows, where $p_i$ represents the predicted value and $q_i$ represents the true value. Formats of the two values are the same. In the eye tracking algorithm, a gaze vector, an angle, a projection point, or the like may be used.

$$\bar{e} = \frac{1}{n}\sum_{i=1}^{n} \|p_i - q_i\|_2$$

2) Variance

The variance is a variance of the mean error, which specifically measures whether the error is "stable". The expression is as follows:

$$\sigma^2 = \frac{1}{n}\sum_{i=1}^{n} \|e_i - u\|_2$$

$e_i$ represents accuracy of the $i^{th}$ piece of test data, and $\bar{u}$ represents a mean value of errors.

3) Maximum Difference

The maximum difference reflects a maximum degree of difference between a predicted value and a true value. When a maximum difference of an algorithm is relatively small, the algorithm is still relatively accurate in the worst case. The expression is as follows:

$$e_{max} = \max_{1 \le i \le n_1} \|p_i - q_i\|_2$$

4) Precision

Given a specific difference diff, precision of an algorithm is calculated as follows when an error threshold between the predicted value and the true value is diff:

$$acc = \frac{1}{n}\sum_{i=1}^{n} I(\|p_i - q_i\|_2 < \textit{diff})$$

3. Inter-Group Performance Indicator

Inter-group performance indicators include but are not limited to the following:

Robustness

Different groups of test data are collected in different external environments. The robustness of an algorithm to an external condition may be measured by controlling variables. For example, impact of various conditions such as illumination, different infrared light source positions, a quantity of infrared lights, a quantity of cameras, and a head posture on a result of the algorithm may be measured.

The inter-group performance indicator T(m,tag) represents the robustness of an algorithm m to an external environment variable tag. Usually, two groups of test data are obtained by setting tag to different values (for example, when tag represents illumination, two groups of different values can be extracted by setting tag to natural light and laboratory light separately; for details, see the performance test process for the eye tracking algorithm).

Set tag to different values to generate two groups of test data, which are denoted as group 1 and group 2; perform intra-group performance test on each of the two groups of test data to obtain corresponding intra-group performance indicators (such as accuracy and variance) of each group. Then the inter-group performance indicators are defined as follows:

$$T(m, \text{tag}) = k * |e_1 - e_2| + t * |\sigma_1 - \sigma_2|$$

k and t are constants and greater than 0, $e_1$ and $e_2$ represent accuracy, and $\sigma_1$ and $\sigma_2$ represent variance. A smaller indicator value indicates a higher robustness of the algorithm to an environment corresponding to the tag.

4. Overall Performance Measurement

To compare different types of algorithms, the following formula defines the following overall performance measurement indicators:

$$V(m) = \frac{1}{t} * \left( a * acc * e^{-dist} + \beta * \left( \bar{e} + \frac{1}{e_{max}} \right) - \gamma * \sum_{tag} T(m, tag) \right)$$

m represents an algorithm number. A larger value of V(m) indicates a better eye tracking algorithm.

α, β, and γ are constants greater than 0, and γ is generally set to a small value.

t represents the time required for the algorithm to run once, dist represents stability of the algorithm, acc represents precision of the algorithm, $\bar{e}$ represents accuracy of the algorithm, and $e_{max}$ represents a maximum difference. T(m, tag) represents the robustness of an algorithm m to an environment corresponding to tag.

V(m) means that a good eye tracking algorithm should be stable, accurate, and fast. Even if the algorithm is poor, it should have a certain accuracy and be robust to most external environmental conditions.

Part 2. Definition of an Overall Architecture of a Performance Test Environment for an Eye Tracking Algorithm As shown in FIG. 1, the overall test architecture includes an input module and its internal structure, an indicator calculation module and its internal structure, and an overall format of each test data provided by a test environment.

1. Overall Architecture

The overall architecture of the test environment includes:

an input module, configured to generate and manage test data required by the algorithm, which is grouped by tags;

an eye tracking calculation module, configured to obtain an eye tracking prediction result based on input test data and a used eye tracking algorithm; and an indicator calculation module, configured to calculate various types of indicators based on a predicted result and a real result, save and output results.

In order to ensure the versatility of the test environment, it is stipulated that an output of the input module be aligned with an interface of the eye tracking calculation module, that is, the eye tracking algorithm is required to have an input and output format that meets requirements.

Figure 2:
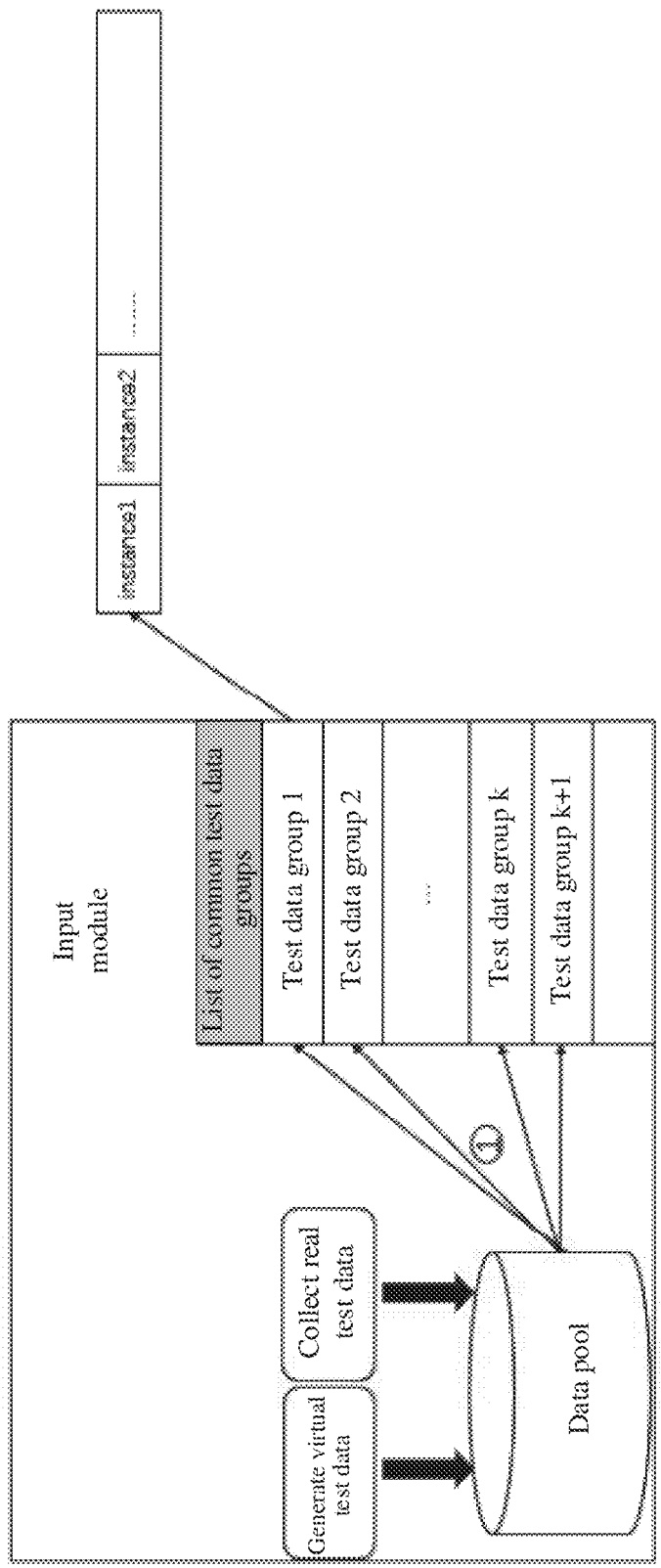
FIG. 2 is a schematic diagram of an input module.

As shown in FIG. 2, the input module is configured to maintain a list of common test data groups. Within each group of test data, each piece of test data is identified as an instance, and tags of all instances in each group of test data are the same, indicating that all specified data in the group is data under the same specified environmental condition. Tags between groups are not restricted.

For a specific eye tracking algorithm, if there is no test data suitable for the algorithm in the list of test data groups, appropriate test data instances may be added a test data pool by generating virtual test data or collecting real test data, and then corresponding test instances are extracted from the data pool based on corresponding tags to form multiple test data groups, so as to continue the test process.

For example, a typical tag A may be described as: test data of Asians collected by using two cameras and two infrared light sources in an indoor environment. Then, test data that meets the tag A may be extracted from the data pool based on the tag A to form a group, and the group is added to the list of test data groups for subsequent algorithm performance measurement.

Figure 3:
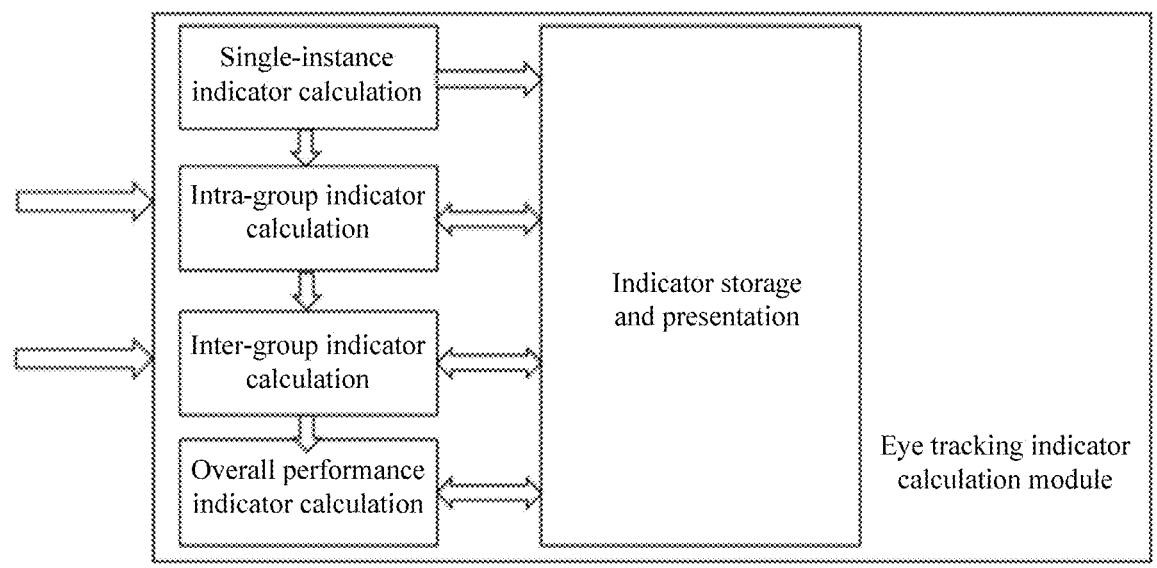
FIG. 3 is a schematic diagram of an indicator calculation module.

As shown in FIG. 3, the indicator calculation module of this application includes three parts:

part 1: single-instance indicator calculation, which mainly measures a difference between a value solved by the eye tracking algorithm and a true value, including a two-norm error and an angle error between a predicted optical axis and a real visual axis, a two-norm error and an angle error between a predicted visual axis (compensating the predicted optical axis) and the real visual axis, and the like;

part 2: intra-group indicator calculation, which may be used to analyze average performance of the eye tracking algorithm on a group of test data, or analyze and compare the performance of two different eye tracking algorithms on the same group of test data;

part 3: inter-group indicator calculation, which may be used to analyze performance of one eye tracking algorithm on data of different tags.

2. Unification of Test Data Formats

Figure 4:
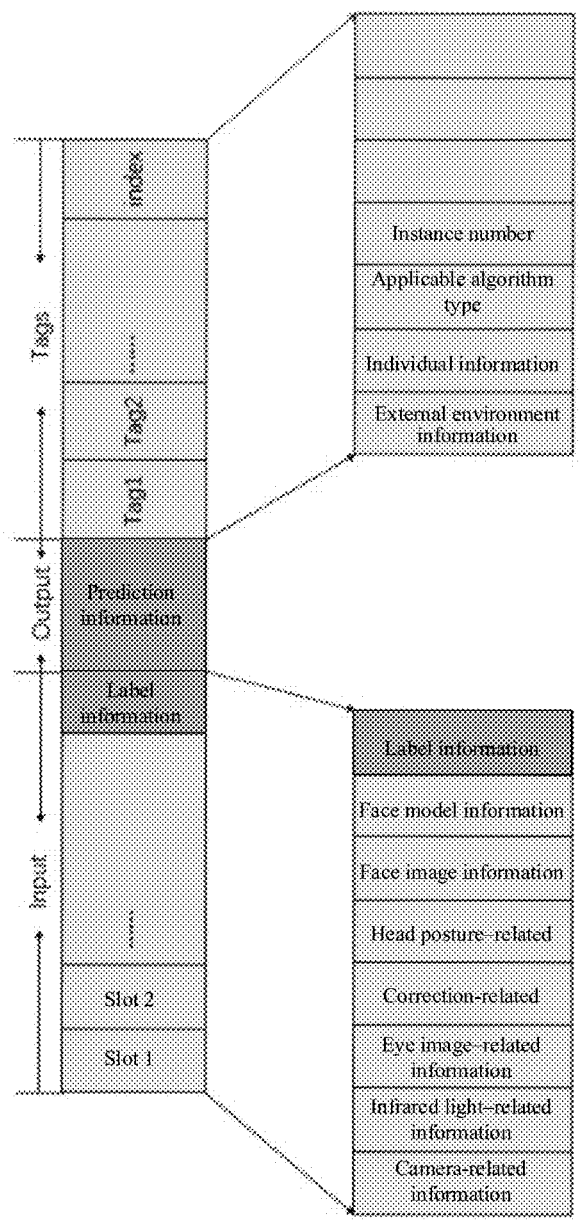
FIG. 4 is a schematic definition diagram of an overall format of test data.

As shown in FIG. 4, the unification of test data formats is the key to decoupling the overall test environment from the algorithm. The test data format is mainly divided into the following three parts:

1) Input Feature

A set of input data that an algorithm needs to use is denoted as input. The input includes but is not limited to camera-related information, infrared light-related information, and eye image-related information, and can be extended by increasing an amount of data in the Input field.

The input data is divided into blocks according to correlation of the data. Each slot in the Input field is abstracted as a part of the input data. The camera-related information in the input data is abstracted into a specific field, which includes information such as a quantity of cameras and internal and external parameters of a camera.

Different eye tracking algorithms can obtain results of eye tracking (that is, a gaze vector or a gaze point position) by finding a solution based on the data in the Input field by using a convolutional neural network or a traditional PCCR method.

Specifically, the input data may include the following fields:

Camera-related information, such as a quantity of cameras, a position of each camera in the world coordinate system, and internal parameter information of each camera.

In a typical object-oriented programming implementation, camera-related data corresponds to a specific class type, and the quantity of cameras, position, and internal parameters are class members of this class. By analogy, each of other fields corresponds to an object.

Infrared light-related information, such as a quantity of infrared lights and a position of each infrared light source in the world coordinate system.

Eye image-related information, such as a quantity of images, which camera shot each image under which infrared light source, a position of the pupil center detected in an image, a position of a glint point in the image, and left-eye image or right-eye image.

Correction-related information, such as a compensation angle between an optical axis and a visual axis, which is usually obtained by calibration.

Face model information, such as three-dimensional (3D) face model information.

Face image information, such as overall image information of the face captured by a camera, and detected image-related information, for example, two-dimensional face key points.

Head posture information, such as pose information of a face coordinate system in a camera coordinate system.

Label-related information, such as gaze vector information indicating that test data is true.

2) Predicted Value

An output of the eye tracking algorithm is denoted as output. The Prediction information field is recorded. Types of the Label information fields of the test data are the same. These two fields must exist, and internal data of the fields can be extended.

3) Environmental Condition

Environmental conditions during input data collection are denoted as tags. Typical tags can be divided into environmental information, individual information, and applicable algorithm type. An illumination condition, and indoor or outdoor may be classified as external environment information. Bright or dark pupil, and race may be classified as individual information.

This field is internally extensible.

Environment-Related

This field indicates an external environmental condition under which data is collected, which may be internally subdivided into other fields, including an illumination type, indoor or outdoor, natural light or infrared light, day or night, and the like.

Individual-Related

This field indicates correlation between data and human, which may be internally subdivided and extended, including an identification (ID0 of a user to which the data belongs, bright or dark pupil, skin color, age, and the like.

Collected Object Number

This field identifies a number of a specific user to which the test data belongs.

Applicable Algorithm Type

This field indicates that the data can be applied to the test of which eye tracking algorithm, such as the PCCR method and the appearance-based method. A quantity of method types is not fixed and can be extended.

Instance Number

This field indicates a globally unified number of test data. During actual test, each field is a "pointer" pointing to an object of a specific class. If a test instance does not have data of this field, it is usually set to NULL. For a specific eye tracking algorithm, there is a specific test instance meeting the specified format.

3. Starting Point of the Test Data Format Unification Design

1) The input data very likely coincide. In view of the high data collection cost, the input data may be reused. For the traditional PCCR method and its derivative algorithms, required data is very similar, and mainly differs in the quantity of infrared light sources, a position of each infrared light source, the quantity of cameras, positions of the cameras, an eye image collected by each camera, a detected pupil center and glint center, and the like. For the appearance-based method, all features that may be used may be stored, and different appearance-based methods may choose different features to build an algorithm flow.

2) On data with the same tag, different eye tracking algorithms may be designed to compare algorithm architectures. Algorithms are comparable only when their data sources are the same.

3) For the same algorithm, data of different tags may be input to check whether the algorithm is sensitive or robust to a specific tag. For example, for a PCCR-based method, the algorithm performance indicator on the bright or dark pupil may be observed.

4) The unification of the algorithm input and output format is beneficial to the decoupling of the algorithm from a test platform. As long as an algorithm meets the corresponding input and output format, the test platform can be used to test its performance.

Part 3. Process of the performance test method for the eye tracking algorithm

Figure 5:
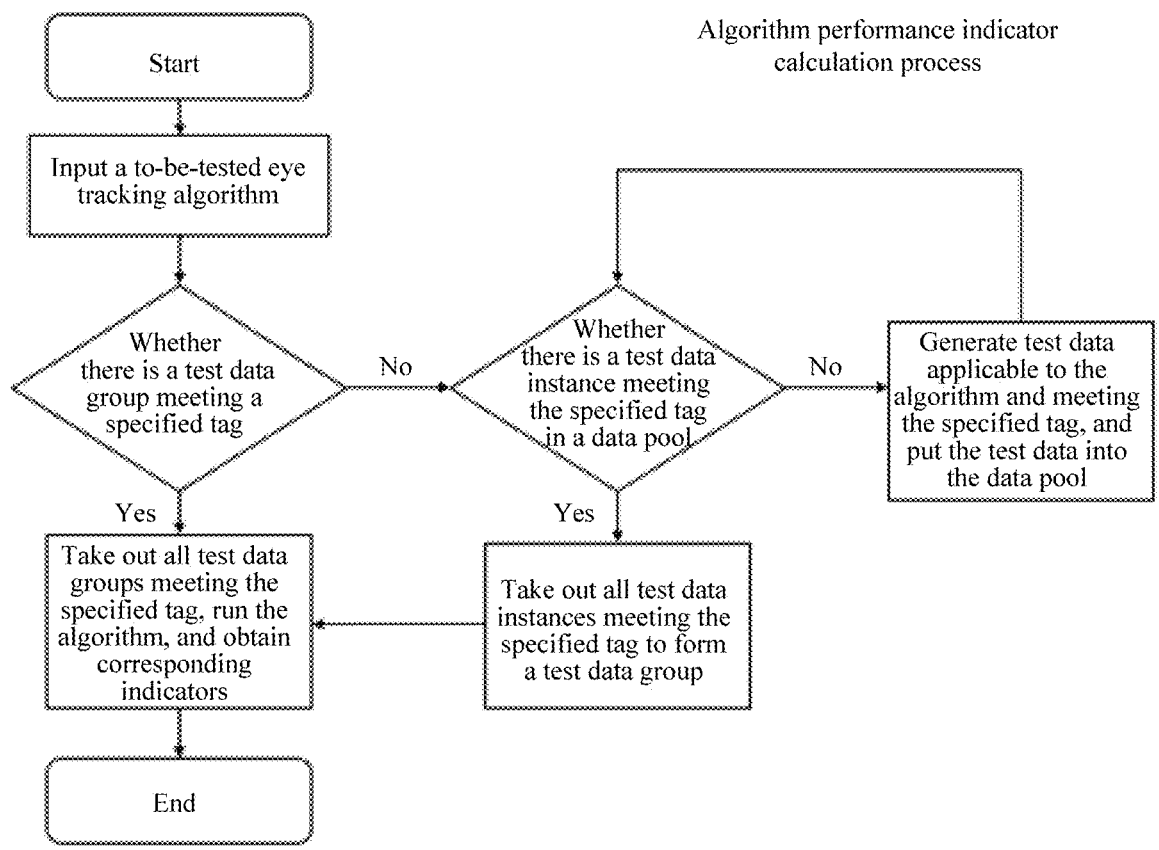
FIG. 5 is a schematic flowchart of a performance test method for an eye tracking algorithm.

As shown in FIG. 5, based on the above-mentioned performance test indicators and test environment for the eye tracking algorithm, the method includes the following steps:

1) Performance Test of the Algorithm Itself

For a to-be-tested eye tracking algorithm, determine whether there is a test data group suitable for the algorithm in a current test module data list; if yes, take out the corresponding test data group, run the algorithm, calculate corresponding indicators, and store them to complete a single-step test process of the entire algorithm.

If there is no test data group that satisfies the algorithm, check whether there is a test data instance meeting a corresponding tag in a data pool. If yes, take out the test data instance to form a data group, and then perform test; if no, generate virtual data or collect actual data that meets requirements of the algorithm, put the data into the data pool, and repeat the preceding steps to complete the calculation of performance indicators of a single algorithm.

2) Comparison for Algorithms Under a Same Test Data Group

To compare performance indicators of multiple algorithms on the same test data group, run each algorithm on the test data group to obtain $S(m,i)$, an indicator set of an algorithm m on the $i^{th}$ group of test data; obtain $S(m,j)$ in the same way, and further obtain $T(m,tag)$.

3) Performance Test Comparison of a Same Algorithm Under Different Test Data Groups Run the algorithm on different test data groups to obtain the indicator set $S(m,i)$ of the algorithm m on the $i^{th}$ group of test data, and obtain $S(m,j)$ in the same way. If the $i^{th}$ group of test data and the $j^{th}$ group of test data only differ in data x in a specific group, such performance comparison aims to compare the robustness of the algorithm to the specific group, that is, whether the algorithm performs better with the data x.

It should be understood that those of ordinary skill in the art can make improvements or transformations based on the above description, and all these improvements and transformations should fall within the protection scope of the appended claims of the disclosure.

What is claimed is:

1. A test method for an eye tracking algorithm, comprising the following steps:

1) test of performances of an algorithm itself for a to-be-tested eye tracking algorithm, determining whether there is a test data group suitable for the to-be-tested eye tracking algorithm in a current test module data list; if yes, taking out the corresponding test data group, running the to-be-tested eye tracking algorithm, calculating corresponding indicators, and storing the corresponding indicators to complete a single-step test process of the entire to-be-tested eye tracking algorithm;

if there is no test data group that satisfies the to-be-tested eye tracking algorithm, checking whether there is a test data instance meeting a corresponding tag in a data pool; if yes, taking out the test data instance to form a data group, and then performing test; if no, generating virtual data or collecting actual data that meets requirements of the to-be-tested eye tracking algorithm, putting the virtual data or the actual data into the data pool, and repeating the preceding steps to complete calculation of performance indicators of the to-be-tested eye tracking algorithm;

2) comparison for algorithms under a same test data group to compare performance indicators of multiple algorithms on a same test data group, running each algorithm of the multiple algorithms on the test data group to obtain an indicator set $S(m,i)$ of an algorithm m on an $i^{th}$ group of test data; obtaining $S(m,j)$ in the same way, and further obtaining $T(m,tag)$;

3) performance test comparison of a same algorithm under different test data groups running the to-be-tested eye tracking algorithm on different test data groups to obtain the indicator set $S(m,i)$ of the algorithm m on the $i^{th}$ group of test data, and obtaining $S(m,j)$ in the same way; wherein if the $i^{th}$ group of test data and a $j^{th}$ group of test data only differ in data x in a specific group, such performance comparison aims to compare a robustness of the to-be-tested eye tracking algorithm to the specific group, that is, whether the to-be-tested eye tracking algorithm performs better with the data x.

2. The test method for an eye tracking algorithm according to claim 1, comprising defining performance test indicators of the eye tracking algorithm, specifically comprising a single-instance performance indicator, an intra-group performance indicator, and an inter-group performance indicator.

3. The test method for an eye tracking algorithm according to claim 2, wherein in a definition of the performance test indicators of the eye tracking algorithm, the single-instance performance indicator comprises at least one of stability, precision, or a running speed.

4. The test method for an eye tracking algorithm according to claim 2, wherein in a definition of the performance test indicators of the eye tracking algorithm, the intra-group performance indicator comprises at least one of accuracy, variance, a maximum difference, or precision.

5. The test method for an eye tracking algorithm according to claim 2, wherein in a definition of the performance test indicators of the eye tracking algorithm, the inter-group performance indicator comprises robustness.

6. The test method for an eye tracking algorithm according to claim 1, wherein an overall test architecture comprises an input module and an internal structure of the input module, an indicator calculation module and an internal structure of the indicator calculation module, and an overall format of each test data provided by a test environment.

7. The test method for an eye tracking algorithm according to claim 2, wherein an overall test architecture comprises an input module and internal structure of the input module, an indicator calculation module and an internal structure of the indicator calculation module, and an overall format of each test data provided by a test environment.

* * * * *